May 6, 1952
H. W. BECKER
2,595,443
HIGH FIDELITY AMPLIFIER
Filed March 14, 1946
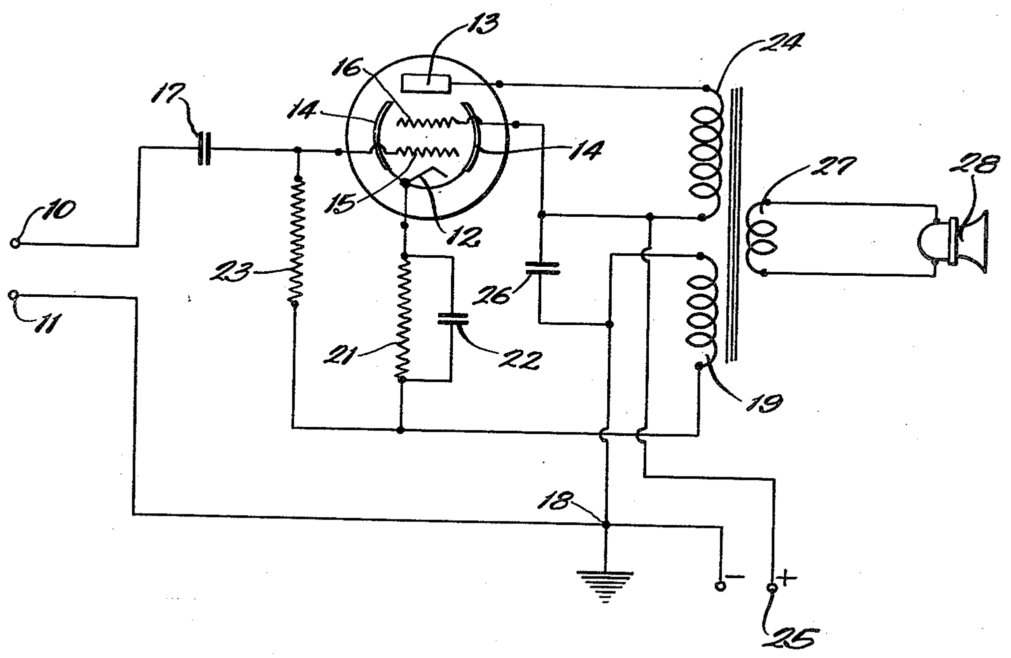
Inventor:
Harry W. Becker,
By Dawson, Booth and Spangenberg,
Attorneys.

Patented May 6, 1952

2,595,443

UNITED STATES PATENT OFFICE 2,595,443

HIGH FIDELITY AMPLIFIER

Harry W. Becker, Chicago, Ill.

Application March 14, 1946, Serial No. 654,318

8 Claims. (Cl. 179—171)

This invention relates to amplifiers and more particularly to power output or voltage amplifiers of the type adapted for use with audio apparatus.

One of the objects of the invention is to procide a simple and inexpensive amplifier in which distortion is minimized or eliminated.

Another object is to provide an amplifier giving greater power amplification than conventional amplifiers using comparable tubes without the signal distortion of conventional amplifiers.

Still another object is to provide an amplifier having the characteristics of a push-pull amplifier circuit but employing a single tube.

A further object is to provide an amplifier embodying inverse feedback in a very simple circuit.

A still further object is to provide an amplifier producing a high damping factor on the load to eliminate the distortion normally resulting from variable loads.

The above and other objects and advantages of the invention will be more readily apparent from the following description when read in connection with the accompanying drawing, in which—

The single figure is a circuit diagram of the amplifier embodying the invention.

The amplifier of the present invention is applicable to class A, class B or class C amplification in substantially any desired frequency range. It has been illustrated, however, in connection with an audio power amplifier for driving a loud speaker.

As shown, the signal to be amplified is supplied at input terminals 10 and 11 from any desired pre-amplifier stage or from another source of signals to be amplified. The amplifier comprises a single tube which must have at least a cathode, a plate and two grids. The tube illustrated is a beam power tetrode having a cathode 12, an anode 13, beam forming plates 14 electrically connected to the cathode, a control grid 15 and a screen grid 16. The control grid 15 is connected through a blocking condenser 17 to the signal input terminal 10. The terminal 11 is connected to ground at a connection point 18 and to the upper side of a transformer primary winding 19. The lower side of the transformer primary winding 19 is connected to the cathode 12 through a grid bias resistor 21 which is by-passed by a condenser 22 to by-pass signal currents. A resistor 23 is connected between the grid and the cathode, as shown, across which the signal is applied to the tube.

The anode or plate circuit of the tube includes a second transformer primary winding 24 which is wound similarly to the winding 19 and connected at its upper end to the anode 13. The lower end of the winding 24 is connected to a source of plate supply voltage 25 and is also connected to the screen grid 16 of the tube. A condenser 26 couples the screen grid 16 and the lower end of the winding 24 to the upper end of the winding 19, as shown.

The transformer includes a secondary winding 27 coupled to both of the windings 19 and 24 and connected to the voice coil of a loud spreaker 28.

In operation of the circuit the signal is applied across the resistance 23 and the transformer winding 19 in series. The voltage across the transformer winding 19 is in phase and in series with the input signal so that only the differential voltage is applied between the grid and the cathode. When the grid 15 is positive the anode current increases and the screen current decreases. The anode current flows from the anode 13 through the winding 24 to positive B supply source 25, through the B supply source to 18, and through the winding 19 to the cathode. The voltage produced by this current flow through the winding 19 is in phase with the input signal. The screen grid current flows from the screen 16 to the B supply source to 18 and through the winding 19 to the cathode. The anode current through winding 19 develops a voltage across this winding which is in phase with the input signal and out of phase with the voltage developed across winding 24. The screen grid current through winding 19 develops a voltage which is out of phase with the signal. The total screen current approximately equals the distorted portion of the anode current and consequently cancels the distortion because of the inverse relationship.

The condenser 26 provides for flow of screen signal currents directly through the winding 19 to the cathode without going through the power supply. Thus this condenser bypasses the power supply and eliminates the effect of power supply impedance in the screen grid circuit through the winding 19. The screen grid current through the winding 19, is more highly effective to cancel distortion than if the condenser 26 were omitted.

It will be seen that in this circuit the windings 19 and 24 are series aiding and are voltage opposing with respect to ground so that their phase relationship is inverse.

The voltage appearing across the winding 19 also serves as a negative feedback voltage to cancel noise and distortion in the circuit. This is possible because the winding 19 is connected in series in the input signal circuit and is inverse in phase with respect to the voltage across the winding 24.

In this circuit the winding 19 is connected to a relatively low impedance source which remains substantially constant for all signal frequencies. This provides a very high damping factor on the load as applied to the secondary winding 27 to eliminate the distortion normally resulting from the use of high plate impedance tubes with variable loads such as loud speakers.

The amplifier of the present invention provides all of the advantages of combined push-pull and inverse feedback circuits without the circuit complications of either the normal push-pull or inverse feedback arrangement. The combination of the two effects is made possible in the present circuit without the apparatus complications and the instability which result from attempts to combine conventional circuits of these two types. It is, therefore, possible with the present amplifier to produce an undistorted power output far in excess of that obtainable with similar types of tubes conventionally connected and to obtain fidelity throughout the full range which is substantially greater than that of even far more complicated conventional circuits.

It will also be noted that the circuit as shown can be used as a voltage amplifier with the same advantages as described above for power amplification. The voltage in the plate circuit of the tube may be substantially in excess of the applied signal voltage, and this amplified plate voltage is impressed on the winding 24. By providing the winding 24 with a larger number of turns than the winding 19, as is the normal circuit design, the voltage output may be amplified over the applied signal voltage. At the same time the push-pull and negative feedback features are retained to minimize distortion.

It will be observed that the winding 19 is connected in a cathode follower circuit with cathode 12, control grid 15, and screen grid 16. The winding 24 is connected in a plate-coupled or conventional amplifier circuit with cathode 12, control grid 15 and anode 13. Moreover, these two windings define impedance means coupling the circuits in inverse phase relation.

While one embodiment of the invention has been shown and described in detail herein, it will be understood that this is illustrative only and is not intended as a definition of the scope of the invention, reference being had for that purpose to the appended claims.

What is claimed is:

1. An amplifier for use with a source of signals comprising an electron tube having cathode, anode, and control electrodes and an auxiliary electrode, a transformer having a pair of windings, means defining a cathode follower circuit including one of said windings, said cathode, said control electrode and said auxiliary electrode, means defining a conventional amplifier including the other of said windings, said cathode, said control electrode, and said anode, said windings being arranged in series aiding relationship, and a dynamic type loudspeaker operatively connected to said transformer.

2. An amplifier for use with a source of signals comprising an electron tube having cathode, anode, and control electrodes and an auxiliary electrode, a transformer having a pair of windings, means defining a cathode follower circuit including one of said windings, said cathode, said control electrode and said auxiliary electrode, means defining a conventional amplifier including the other of said windings, said cathode, said control electrode, and said anode, said windings being arranged in series aiding relationship, and means defining a conductive current path from the control electrode to the cathode.

3. In an amplifier for use with a source of signals, the improvement comprising a transformer having a pair of magnetically linked windings, means including an electron tube having an electron stream defining a conventional amplifier in conjunction with one of said windings, means including said electron tube and acting on said electron stream defining a cathode follower amplifier in conjunction with the other of said windings, said windings being arranged in series aiding relationship, and a dynamic type loudspeaker operatively connected to said transformer.

4. The combination in an amplifier for a source of signals of a beam power type electron tube having cathode, anode, and control electrodes and a screen electrode, a transformer having a pair of magnetically linked windings, a source of unidirectional E. M. F., means connecting said source of signals, one of said windings and the cathode-control electrode space path of said tube in series, means connecting said one winding, and the cathode screen-electrode space path of said tube in series, means connecting said source of unidirectional E. M. F., said other winding, and the cathode-anode space path of said tube in series, said windings being arranged in series aiding relationship, a dynamic type loud speaker operatively connected to said transformer, and means defining a conductive current path from the control electrode to the cathode.

5. An amplifier for use with a source of signals comprising an electron tube having cathode, anode and control electrodes and an auxiliary electrode, a transformer having a pair of windings, a connection from the control electrode to one side of the signal source, a connection from the anode through one of the windings to the other side of the signal source, a B supply in said connection between said one of the windings and the other side of the signal source, a connection from the other side of the signal source through the other winding to the cathode, a connection from the auxiliary electrode through said other winding and the B supply to the other side of the signal source, said windings being arranged in series aiding relationship and a condenser connected directly between the auxiliary electrode and the other side of the signal source.

6. The amplifier of claim 2 in which the last named means comprises a resistor directly connecting the control electrode and the cathode.

7. The amplifier of claim 4 in which the last named conductive current path includes a resistor.

8. The amplifier of claim 5 including a resistor connected directly between the control electrode and the cathode.

HARRY W. BECKER.

REFERENCES CITED

The following references are of record in the file of this patent:

UNITED STATES PATENTS

| Number | Name | Date |
|---|---|---|
| 1,997,665 | Wheeler | Apr. 16, 1935 |
| 2,214,614 | Hunt | Sept. 10, 1940 |
| 2,284,064 | Morgan | May 26, 1942 |
| 2,383,351 | Smith | Aug. 21, 1945 |
| 2,429,124 | Cunningham | Oct. 14, 1947 |
| 2,480,987 | Wallin | Sept. 6, 1949 |
| 2,481,533 | Pratt | Sept. 13, 1949 |

FOREIGN PATENTS

| Number | Country | Date |
|---|---|---|
| 830,657 | France | Aug. 5, 1938 |

OTHER REFERENCES

R. C. A. Receiving Tube Manual, 1940 edition, page 210 (14–10). (Copy in Library of Congress.)